Jan. 17, 1967     R. H. SMITH ET AL     3,299,425
VEHICLE GUIDANCE APPARATUS UTILIZING WAVE
GENERATED RANGE ONLY INFORMATION
Filed Oct. 14, 1960     5 Sheets-Sheet 1

INVENTORS.
RICHARD H. SMITH
BY   JOHN R. SHOEMAKER

ATTORNEY

Jan. 17, 1967  R. H. SMITH ETAL  3,299,425
VEHICLE GUIDANCE APPARATUS UTILIZING WAVE
GENERATED RANGE ONLY INFORMATION
Filed Oct. 14, 1960  5 Sheets-Sheet 2

INVENTORS
RICHARD H. SMITH
BY JOHN R. SHOEMAKER

ATTORNEY

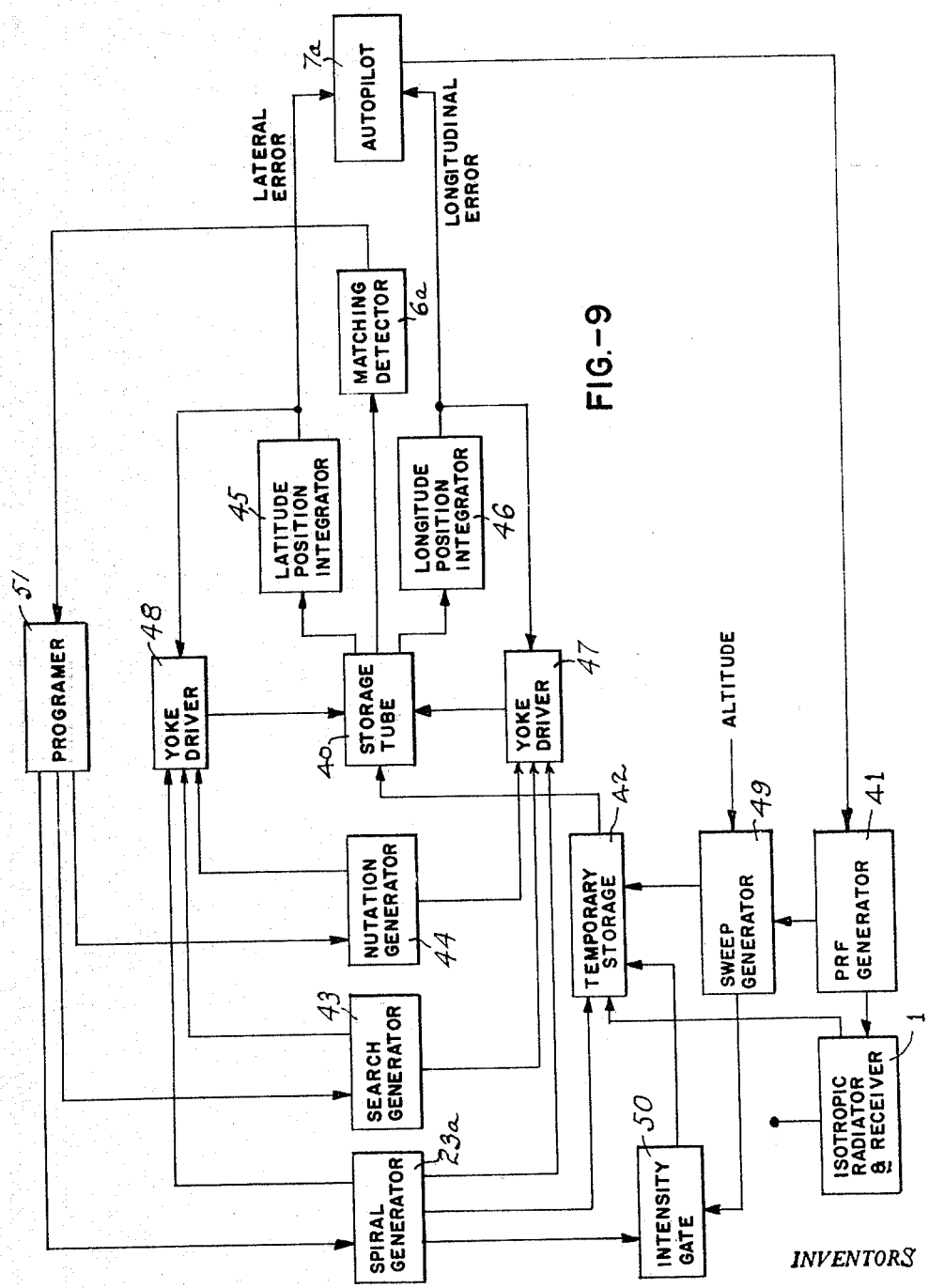

United States Patent Office 3,299,425
Patented Jan. 17, 1967

3,299,425
VEHICLE GUIDANCE APPARATUS UTILIZING WAVE GENERATED RANGE ONLY INFORMATION
Richard H. Smith, North Canton, and John R. Shoemaker, Akron, Ohio, assignors to Goodyear Aerospace Corporation, a corporation of Delaware
Filed Oct. 14, 1960, Ser. No. 62,795
9 Claims. (Cl. 343—7)

This invention relates to vehicle guidance apparatus, and more specifically, is concerned with aircraft or watercraft guidance by range only information obtained from wave generating means such as radar or sonar, isotropically transmitted from the vehicle.

It is now well known to control the guidance of a vehicle, such as an aircraft, by the comparison between a radar picture obtained in the vehicle and showing the terrain over which the aircraft is flying with previously prepared radar map information of the terrain over which the aircraft is intended to fly, followed by correction of the aircraft to bring it on course. Known systems of this type have usually employed a scanning radar antenna to obtain information of the terrain over which the aircraft is flying in both azimuth and range. Such scanning antennas must be stabilized and are inherently bulky and space consuming.

It is the general object of the present invention to avoid and overcome the foregoing and other difficulties of prior art practices by the provision of a vehicle guidance system wherein the wave generating mechanism, such as a radar, carried by the vehicle transmits the generated signal isotropically to the terrain from an unstabilized, non-scanning antenna, and with the return signals from the terrain providing range information only which is then compared with stored information of the course over which the vehicle is intended to pass, and with the comparison resulting in intelligence effecting the guidance of the vehicle.

Another object of the invention is provision of apparatus of the character described whereby the bulk, weight, and cost of guidance apparatus can be materially reduced over that of existing equipment and systems, while still maintaining excellent and acceptable efficiency.

The foregoing objects of the invention, and other objects which will become apparent as the description proceeds, are achieved by the provision of the combination in apparatus for guiding a vehicle over a course of means for isotropically transmitting a wave signal from the vehicle, means for picking up the return signals in terms of range from terrain over which the vehicle is passing, reference means for providing signals in terms of range for the terrain over which the vehicle should be passing, means for comparing the return signals with the reference means signals, and means for correcting the course of the vehicle from the output of the comparing means.

For a better understanding of the invention, reference should be had to the drawings wherein FIG. 1 is a schematic box diagram showing of apparatus incorporating the principles of the invention;

FIG. 9 is a box diagram of a complete apparatus of the invention employing the fundamentals of the combination but utilizing a storage tube for obtaining reference information in terms of range.

Figure 1:
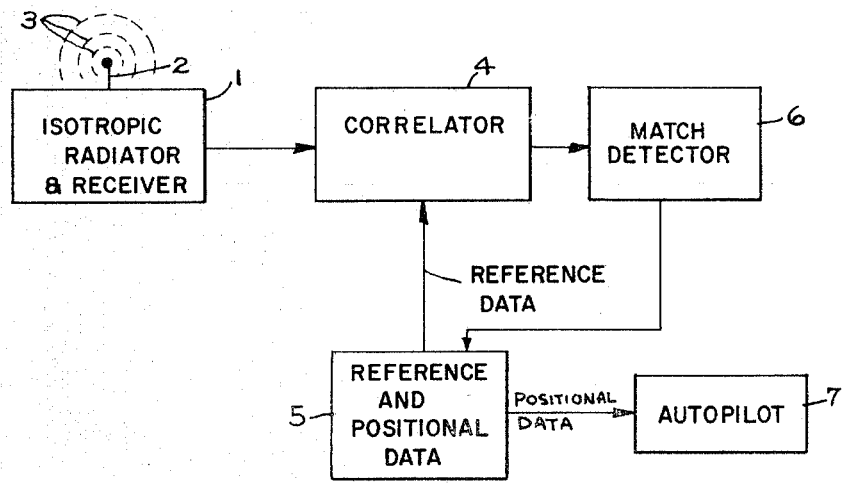

In the drawings, and having particular reference to FIG. 1, the numeral 1 indicates an isotropic radiator and receiver adapted to be carried by the vehicle to be guided. The radiator and receiver are of any known type adapted to transmit from an unstabilized and non-scanning antenna 2 a signal pulse in wave form in all directions simultaneously as indicated by the dotted lines 3 intended to represent the expanding spherical shape of the wave. In the preferred practice of the invention the pulse generated is in the form of a high frequency wave such as the radio frequencies utilized in radar when the vehicle guided is a missile or other aircraft. However, the invention contemplates the generation of a pulse of low frequency wave form such as a sonar wave utilized when the vehicle guided is a land craft, surface ship or a submarine.

After the signal pulse is transmitted by the radiator of apparatus 1, this pulse normally being of only a couple microseconds duration, the receiver of apparatus 1 listens, in the usual manner, for reflected signals returned from targets or scatterers on the terrain over which the vehicle is passing. These return signals, as hereinafter pointed out more specifically, are in an electric wave form or trace constituting range only information, and with no indication of azimuth. The received return signals are transmitted to a correlator 4.

Likewise passed to the correlator 4 from reference and positional data apparatus 5 are a series of stored range only wave forms or traces taken, in effect, from a plurality of points along and over the course on which the vehicle is intended to be guided. The reference and positional data apparatus will be more fully described hereinafter. Suffice it to say now that the range only traces of stored reference information supplied to the correlator 4 are compared with the return signal trace supplied to the correlator 4 from apparatus 1. The correlator 4 for example a multiplication circuit keeps multiplying the stored reference traces with the signal return trace and then a match detector 6 in effect picks out of the stored reference traces the trace which is the most nearly like the return signal trace. A more specific description of this operation and the apparatus to achieve it is given hereinafter.

The match detector 6 actually detects the highest output of the correlator 4 and functions to trigger or dump upon the completion of the search through the stored reference information the passage of longitudinal and lateral error signals or voltages to auto pilot 7. The positional data portion of apparatus 5 serves to control the amount and the polarity of the error voltages, this being effected by the distance and angle by which the matching stored reference trace is offset from the position that the vehicle should be when on course.

It will be understood that the designation "auto pilot" on apparatus 7 is intended to cover any of the several types of conventional inertial guidance mechanism which are normally employed in the vehicle being guided to keep it substantially upon the intended course. Thus, the apparatus of the present invention usually serves as an added control to overcome any errors present in the conventional inertial guidance system, but in certain installations it may entirely supplant the conventional inertial guidance system if operated repetitively.

It should likewise be understood that the guidance system of the auto pilot 7 knows where the vehicle is intended to be, i.e. its indicated position, whereas the error voltages passed to it is an indication of where the vehicle actually is, all as hereinafter more fully stated. The voltages passed to the auto pilot 7 then are used to either correct the lateral and/or longitudinal position of the vehicle or to correct the indication position of the auto pilot, all of which will be understood by those skilled in the art.

Figure 2:
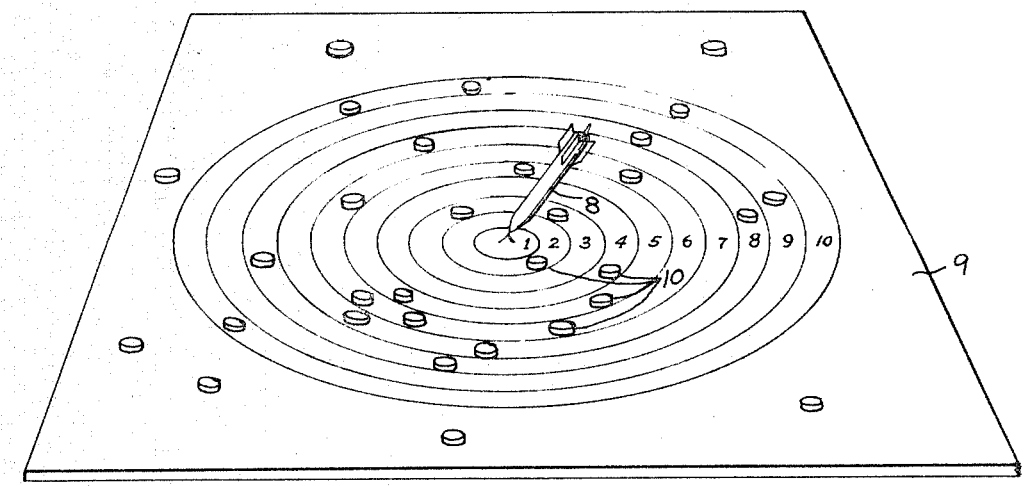
FIG. 2 is a diagrammatic view in perspective of a vehicle, such as a missile, having a number of targets on the terrain separated in range from the vehicle.

Now for a more detailed consideration of the manner of operation of the apparatus of the invention and the principles thereof, attention is directed to FIG. 2 wherein a vehicle such as missile 8 is shown in flight over terrain 9, the terrain having a plurality of targets or scatterers, certain of these being identified by the numeral 10. Now when a wave pulse of short duration is transmitted isotropically from the missile 8 followed by a period of listening for the return signals the wave pulse will fan or progress outwardly in spherical form and hit the various targets 10 from which return signals will be reflected back to the receiving apparatus of the missile 8. These return signals provide an indication of range only of the various targets 10 and produce a wave form or trace at the receiver in the missile 8 of a form graphically shown at 11 in FIG. 3 wherein the abcissa is range and the ordinate is intensity.

Figure 3:
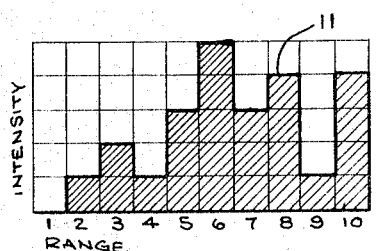
FIG. 3 is a diagrammatic showing in simulated wave form of the average range only signals returned by the targets of FIG. 2 as the result of an isotropically transmitted signal pulse from the vehicle.

More particularly, FIG. 2 shows how the transmitted pulse from the missile 8 illuminate the terrain 9 as a circle of gradually increasing diameter, and for purposes of illustration and constantly increasing diameter circle is shown as a series of concentric circles each representing a different range from the missile 8. Each circle on the terrain 9 is given a progressively greater number indicating range and these same numbers are utilized in FIG. 3. In circle marked 1 there are no targets, hence there is no return signal to be put in the column marked 1 of FIG. 3. In the circle marked 2 on the terrain 9 there is a single target 10 and in the column marked 2 of FIG. 3 is a single signal return. In the circle marked 3 on the terrain 9 there are two targets 10 so that in the column marked 3 in FIG. 3 there are two signal returns thereby increasing the signal intensity.

In a like manner, the rest of the wave form of FIG. 3 is reproduced to represent the return signal wave form or trace of the terrain 9, this wave form or trace providing range only information of a varying intensity to the missile 8 as will be seen. In actual practice the wave form or trace indicated by the numeral 11 in FIG. 3 is never of the very sharp cornered contour shown in FIG. 3, but nonetheless is of a very definite and characteristic form so that it becomes a recognizable indication of the location of the missile 8 and the targets 10 on terrain 9 at a given instant. The intensity of the signals depend upon the number, range, and electromagnetic wave reflectivity of the targets.

Figure 4:
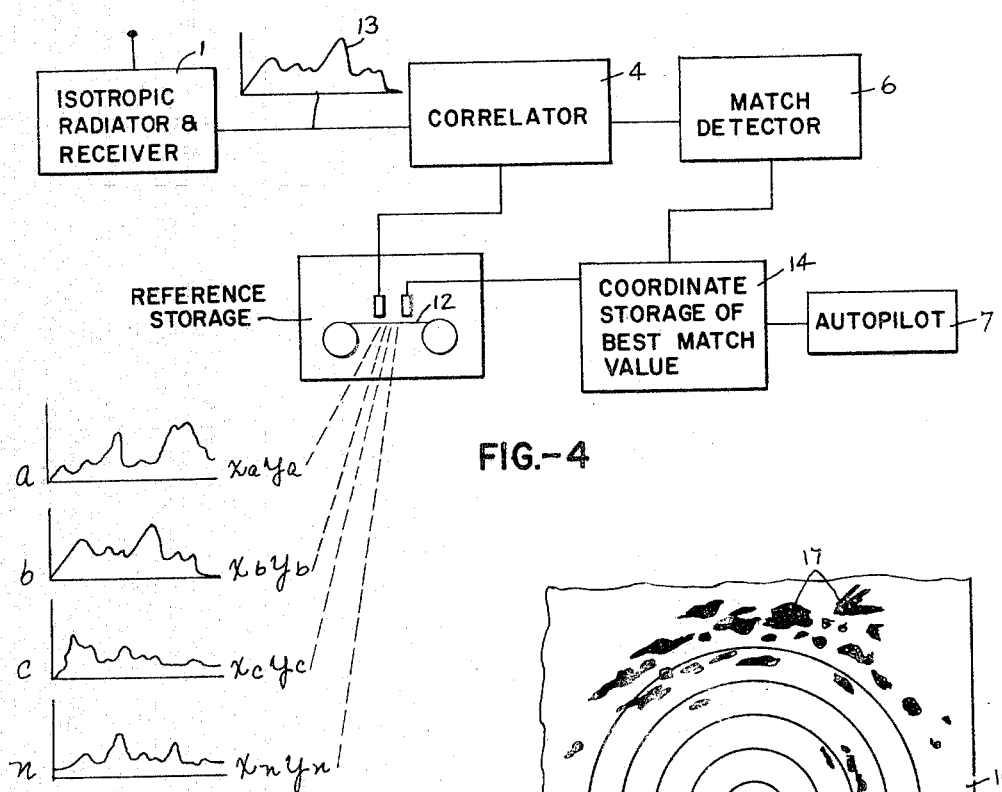
FIG. 4 is a view similar to FIG. 1 but illustrating in greater detail the use of range only signals or traces utilized in the reference storage portion of the apparatus in one embodiment of the invention.

In FIG. 4 is illustrated an embodiment of the invention wherein the stored reference information is provided upon a magnetic tape, drum, or the like, a magnetic tape being indicated at 12. The stored information is in the form of a plurality of wave forms or traces, typically shown in traces $a, b, c, \ldots n$, the number of traces stored being determined by the required accuracy of the guidance system. Usually the number of stored reference traces will be over a thousand and less than twenty thousand.

The reference traces $a, b, c, \ldots n$, are prepared by known techniques such as the recording of the return signals of an isotropic radiator on a magnetic tape during a reconnaissance flight over the desired course, or the simulation of traces from radar maps prepared in a laboratory or prepared by a reconnaissance flight over the desired course. Each trace represents information of a particular and a different point of the terrain over which the vehicle is intended to pass. Associated with each trace there is stored positional information identifying the position from which each trace was obtained.

In any event, trace $a$ will be a range only trace taken from a spot having a longitude indicated by $x_a$ and a latitude indicated by $y_a$. In like manner trace $b$ can be designated $x_b, y_b$, trace $c$ can be designated $x_c, y_c$, and trace $n$ can be designated $x_n, y_n$.

Still having reference to FIG. 4, the isotropic radiator and receiver 1, as heretofore described, produces a return signal trace indicated by the numeral 13 and of a shape, for example, almost identical to trace $b$ stored on the magnetic tape 12. Trace 13 passed to correlator 4 is now correlated in turn with traces $a, b, c,$ and $n$ on tape 12, and trace $b$ ends up being stored in coordinate storage 14 as match detector 6 detects the highest output of the correlator 4. In actual practice as the correlating action occurs the nearest trace $a$ to $n$ first located by the correlator 4 is first stored in the storage 14, and this trace is only replaced when a nearer correlation is found so that it is only after a correlation of all of the stored traces $a$ to $n$ with the signal return trace 13 is made can it be determined that trace $b$ is the nearest correlation.

This operation can be more particularly described as follows:

In the correlation or comparison process, the range only trace obtained from the isotropic radiator and the range only trace used as a reference are synchronized and compared incrementally as a function of range. One example of the correlation is described in application Ser. No. 646,041, filed Mar. 14, 1957. Another example of the correlation process can be illustrated by referring to FIG. 3 which shows a range only trace. In this example, correlation could be accomplished by summing the absolute magnitude of the difference between the value at any and all range increments and the value at a corresponding range increment of any other range only traces that is to be correlated. The above examples are just two illustrations of many types of correlation which are well known to anyone skilled in the art of correlation techniques.

Once trace $b$ has been determined as described to be the nearest correlation, and after the complete search of stored information, the stored trace $b$ in the form of two error voltages representative of the position $x_b, y_b$ are dumped or passed to the auto pilot 7. Now assuming that the auto pilot 7 believes that it is at a latitude and longitude corresponding to $x_a, y_a$, which is on course, whereas the vehicle is actually at $x_b, y_b$, as has just been determined. The $x_a$ and $y_a$ positions of the auto pilot each are representative of a voltage so that correction is made by algebraically adding the voltages representing $x_a$ and $x_b$ to provide a voltage to correct for longitude, and the voltages representing $y_a$ and $y_b$ are algebraically added to provide a voltage to correct for latitude. The correction voltages are used to either correct the position of the vehicle, as by turning the rudder, or to correct the indicated position of the auto pilot 7.

By way of further explanation, during the correlation of any two traces, the match point detector 6 monitors the output of the correlator 4 and if this output is greater than any other obtained previously, the match point detector will store this new higher value. Simultaneous with this operation, the detector will generate a trigger which will dump any previously stored position information in the coordinate storage 14 and will read out the positional data of the trace just correlated and permit the storage unit to accept and store this new value. So it can be seen that at the completion of the search operation, the positional data in the form of latitude and longitude associated with the trace that resulted in best correlation will be stored in the coordinate storage 14. This information is then fed to the auto pilot. It can be seen that the difference between this positional information and the indicated position of the auto pilot at the time the isotropic radiator obtained its range only trace is the error that can be used to correct the auto pilot.

Figure 5:
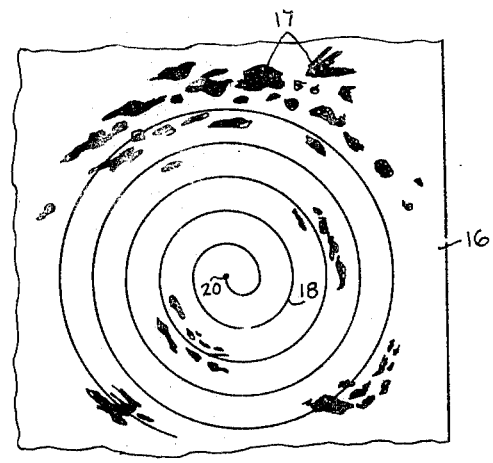
FIG. 5 illustrates in diagrammatic form a portion of a standard radar map or picture with an Archimedes spiral readout thereof.
Figure 6:
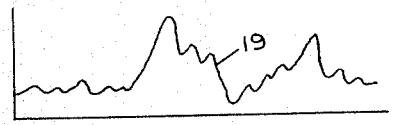
FIG. 6 shows the range only signal or trace resulting from the spiral readout of FIG. 5.

Instead of getting into the complication of having to store on the vehicle to be guided a considerable number of previously prepared traces $a$ to $n$ on a magnetic tape or other storage means, it is possible to obtain a series of range only traces from a previously prepared conventional radar strip map or maps of the terrain over which the vehicle is intended to move. More specifically, FIG. 5 illustrates at 16 a conventional radar strip map of terrain having a plurality of targets 17. Now if this map is examined by a flying spot scanner movable in the direction of an Archimedes spiral 18 a range only trace, such as shown at 19 in FIG. 6 is produced. It will be understood that the trace 19 results from the Archimedes spiral 18 being started from a point 20. Now when the point 20 is moved laterally and/or longitudinally with respect to the map 16 to a plurality of different points and the Archimedes spiral sweep is again made at each new and different position of the point 20 then a whole series of traces like trace 19 are provided by each having a starting point positioned at a different latitude and longitude.

Accordingly, a whole series of traces, such as the traces $a$ to $n$ of FIG. 4 can be provided from a single radar strip map, and in sufficient quantity so that one of these traces is going to be very close to the return signal trace 13 passed to the correlator 4, assuming, of course, that the return signal trace is made with the vehicle moving in the same field as represented by the radar map. Thus, the entire operation of the apparatus of FIG. 4 can be repeated, but with a different type of reference storage than that shown in FIG. 4.

Figure 7:
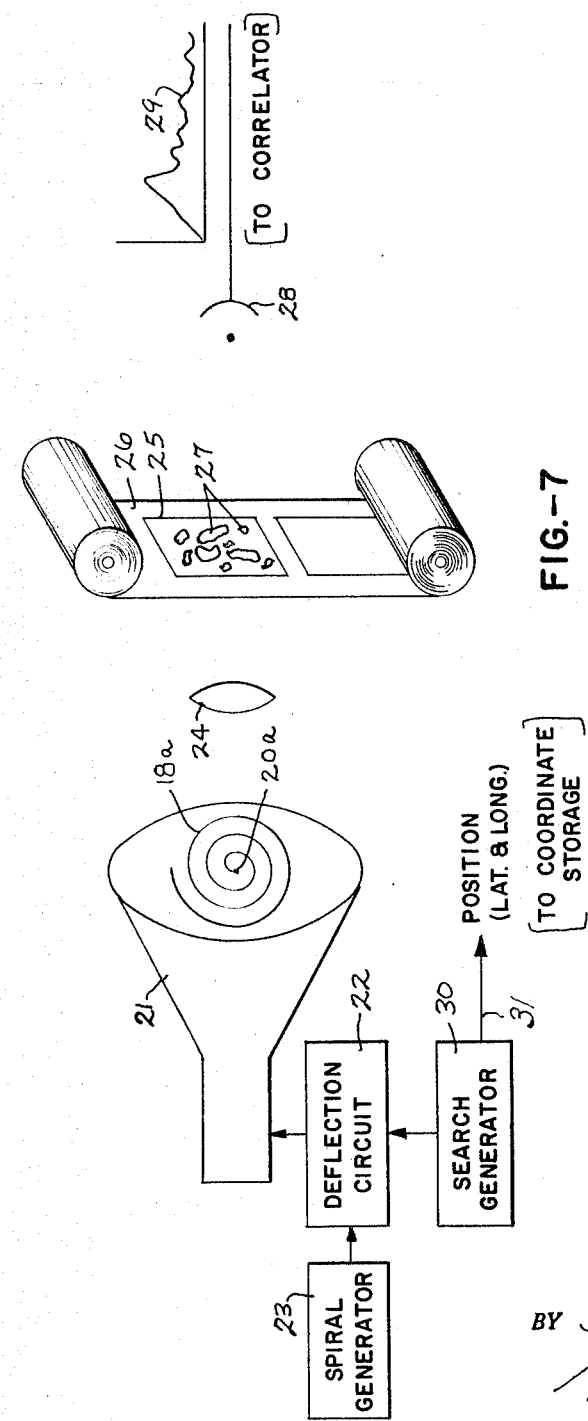
FIG. 7 shows in schematic form the apparatus utilized in conjunction with the spiral readout of stored reference information, this constituting another embodiment of the invention.

FIG. 7 shows one embodiment of apparatus for effecting the Archimedes spiral scan of a previously prepared radar map of the terrain and from a plurality of different starting points for the spiral. In this figure the number 21 indicates a cathode ray tube having deflection circuits 22 controlled by a spiral generator 23 so that the unmodulated beam of the cathode ray tube will define as a pinpoint of light an Archimedes spiral 18a from a starting point 20a. The pinpoint of light is directed through a lens system 24 and against the surface of the previously prepared radar map 25 held as one of a series of maps on a filmstrip 26. Targets 27 on the radar map 25 are substantially transparent with the rest of the map substantially opaque so that when the pinpoint of light from the cathode ray tube strikes certain targets 27 in turn, the light is directed therethrough and against a photocell 28, with the output of the photocell constituting a signal wave or trace 29 which is adapted to be passed to the correlator 4, all in the manner previously described.

Likewise associated with the cathode ray tube 21 is a search generator 30 which changes the position of the starting point 20a of the Archimedes spiral 18a, the search generator 30 having a connection 31 to supply latitude and longitude position voltages to the coordinate storage 14. In this manner a whole series of traces 29 can be generated from a single stored radar map 25, representing traces $a$ to $n$ and representing the different points in longitude and latitude on the radar map 25, one of these points resulting in a trace which can be correlated to show a match with the return signal trace 13, all as previously described.

It will be recognized by those skilled in the art, and before leaving FIG. 7, that the optical-electrical apparatus described can be replaced with an all-electrical apparatus wherein the information of the radar map 25 can be stored on an electric storage tube of conventional type, with this information being read out electrically on an Archimedes spiral generated from a plurality of different starting points for the spiral.

Figure 8:
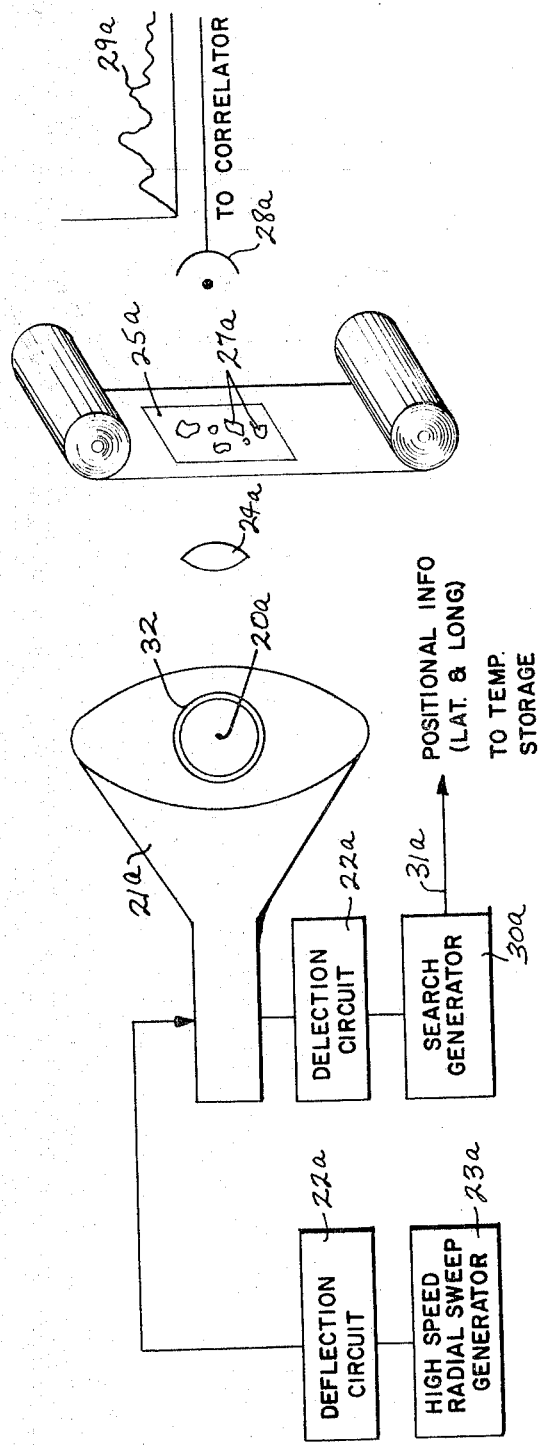
FIG. 8 is a view similar to FIG. 7 but illustrating an expanding ring or doughnut type of readout of stored reference information, this constituting another embodiment of the invention.

FIG. 8 is a view of apparatus similar to that described in conjunction with FIG. 7, but wherein the cathode ray tube 21a is provided with deflection circuits 22a and a tube 21a is provided with deflection circuits 22a and a high speed radial sweep generator 23a which produces a line-like doughnut-shaped ring of light 32 on the face of the cathode ray tube which constantly increases in size and which is concentrated by a lens system 24a to effect a scan of radar map 25a and a passage of light through target areas 27a to a photocell 28a to produce a signal wave or trace 29a for passage to the correlator 4.

More specifically, the cathode ray tube 21a is provided with a beam shaping electrode or mask to shape the electron beam in the form of an "O" or doughnut. This type of shaping is presently used in display tubes that display characters either alphabetic or numeric. The cathode ray tube also has provision for deflecting the doughnut beam in a radial direction by means of a variable radial electrostatic field. The cathode ray tube also has the conventional deflection means, either electrostatic or electromagnetic, to translate the electron beam in either direction.

Associated with the deflection circuits 22a is the search generator 30a for changing the position of the center 20a whereby an effective scan of the radar map 25a is effected from a plurality of points on the radar map separated in longitude and latitude, with voltage indications of the position of the starting point 20a in latitude and longitude being transmitted by electrical connection 31a to the coordinate storage 12, all in the manner previously described. Thus stored reference traces from $a$ to $n$ can be provided.

Before leaving the description of the apparatus of FIG. 8 it will be noted by those skilled in the art the electro-optical function described can likewise be performed entirely electrically by electrically storing the information of the radar map 25a on a conventional storage tube and then reading out this information with the constantly increasing size doughnut-shaped scanning ring 32 to provide a signal trace containing range only information, and with the starting point 20a of the scanning ring 32 being changed as to latitude and longitude to provide a plurality of traces $a$ to $n$ for comparison with the signal return trace 13, as heretofore described.

FIG. 9 ilustrates in somewhat more complete form the apparatus of the invention and utilizing a storage tube 40 to store the reference information. In FIG. 9 the isotropic radiator and receiver 1 is controlled by a pulse repetition frequency generator 41 of known type. It might be stated here that the apparatus of the invention can be utilized to function in a continuously repetitive manner serving to periodically correct the guidance of a vehicle over a long path. In this case it will be recognized that periodic spaced pulses will be sent out by the isotropic radiator 1 under the control of the pulse repetition frequency generator 41 with a listening period for return signals and the guidance correction being effected between each of the transmitted pulses. In this operation a long strip radar map is periodically advanced, or a series of radar maps utilized in turn to provide the stored reference information.

On the other hand, the apparatus of the invention may take but a single look at the terrain and make only one guidance correction from but a single radar map or other source of stored reference information, this sometimes being sufficient in guidance over shorter paths or when the auto pilot or other inertial guidance of the vehicle performs its function well.

In the implementation of FIG. 9, and simultaneously with the scanning of the stored reference grid of the storage tube 40 by the expanding circle, or spiral scan, the electron beam current is caused to vary with the signal return range information from temporary storage 42 in the manner described in patent application Ser. No. 843,-034, filed Sept. 24, 1959. Thus, the storage tube 40 fulfills not only the function of reference storage but also the function of correlation as heretofore described. In this manner, the generation of the range only references from the electrically stored radar map and correlation with the signal return trace are combined. Also it should be apparent that the same combination could be effected in the CRT-optical type apparatus of FIG. 7 or 8.

The search generator 43 of FIG. 9 then in a planned manner causes the center of the expanding sweep to systemically and at a rate slow with respect to the expansion rate of the sweep to search over the entire map stopping at either a prescribed threshold or alternatively at the completion of an entire search returning to the position at which the largest correlation signal was obtained from the storage tube. This technique and the apparatus therefor is described in detail in patent application Ser. No. 237,985, filed July 21, 1951.

The nutation generator 44 is then activated causing the center of the expanding sweep to be moved in a relatively small nutating or search circle. By then examining the component of the correlation signal at the nutation frequency, with conventional servo techniques understood by those skilled in the art, the center of the nutation can be caused to be moved to the accurate point of optimum correlation, which will be evidenced by a minimum in the component of the correlation signal at nutation frequency. This position then corresponds to the actual fix position and is used to provide the correction signals to the auto pilot in the manner more particularly described in conjunction with FIG. 4.

In the above illustration, the reference map is positioned in such a manner so that the undeflected electron or light beam falls on a spot identified as a reference point which can be defined in latitude and longitude. The correlation process will generate an error signal which when integrated by integrators 45 and 46 causes the deflection circuitry to move the center of the spiral or doughnut beam to the position of best correlation. The signals stored on the two integrators thus represent the deviation of the vehicle from the reference point. The absolute vehicle position can thus be obtained through the algebraic sum of these deviations and the coordinates of the reference point. This positional data can then be used to correct the auto pilot as described previously.

The remaining portions of the circuitry of FIG. 9 are substantially conventional or have been previously described, such as spiral generator 23a, matchpoint detector 6a, auto pilot 7a, and isotropic radiator and receiver 1a.

The yoke drivers 47 and 48 generate the currents necessary to deflect the electron beam of the storage tube 40. Of course, if the storage tube employs electrostatic deflection, the yoke drivers can be replaced by amplifiers designed for that specific purpose. The sweep generator 49 accepts the prf signal and a signal representing the vehicle altitude and generates an altitude delayed, hyperbolic sweep necessary to convert the slant range information, per conventional radar techniques, from the radiator 1a to ground range information when read into the temporary storage 42. The intensity gate 50 provides signals to the grid of the storage tube 42 so as to reduce the beam current to zero during sweep flyback. The above process is performed automatically and logically through appropriate sequencing generated by the programmer 51. Functions of the programmer are to turn on the radiator 1a when the auto pilot indicates that the position of the vehicle corresponds to the reference point previously described, to initiate the search function and nutation function of the correlation process and to read out the positional information stored on integrators 45 and 46 and to trigger its passage to the auto pilot 7a.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in apparatus for guiding a vehicle over a course of means for substantially isotropically transmitting a wave signal from the vehicle, means for picking up the return signals in terms of range from terrain over which the vehicle is passing, reference means for providing signals in terms of range for the terrain over which the vehicle should be passing, means for comparing the return signals with the reference means signals, and means for correcting the course of the vehicle from the output of the comparing means.

2. The combination in apparatus for guiding a vehicle over a course of means for substantially isotropically transmitting a wave signal from the vehicle, means for picking up the return signals in terms of range from terrain over which the vehicle is passing, reference means providing a plurality of different signals in terms of range, each different signal being taken from a point displaced from the positions in which the other signals were taken and over the course that the vehicle is intended to traverse, means receiving and correlating the return signals with the different signals from the reference means to pass output voltages representing each different reference signal compared to the return signal, detector means for selecting and storing the reference signal nearest to the return signal in terms of error voltages defining the lateral and longitudinal location from which the reference signal was generated, and auto pilot means adapted to receive from the detector means the stored selected nearest reference signal in terms of error voltages to effect a correction in guidance of the vehicle.

3. Apparatus for guiding an aircraft over terrain and including means for isotropically transmitting a radar pulse from the aircraft, means for picking up the return signals in terms of varying intensity versus range of targets located on the terrain over which the aircraft is passing, stored reference means on the aircraft providing signals in terms of varying intensity versus range from a plurality of laterally and longitudinally separated points above the terrain over which the aircraft should be passing if it is on course, means for comparing the return signals with the reference means signals and for selecting the reference means signals nearest to the return signals, and means responsive to the output of the comparing and selecting means for correcting the course of the aircraft.

4. Apparatus for guiding an aircraft over terrain and including means for isotropically transmitting a radar pulse from the aircraft, means for picking up the return signals in terms of varying intensity versus range of targets located on the terrain over which the aircraft is passing, stored reference means on the aircraft providing signals in terms of varying intensity versus range from a plurality of laterally and longitudinally separated points above the terrain over which the aircraft should be passing if it is on course, said stored reference means constituting a magnetic tape having magnetically impressed thereon in sequence and in terms of varying intensity versus range the plurality of signals, means for comparing the return signals with the reference means signals and for selecting the reference means signals nearest to the return signals, and means responsive to the output of the comparing and selecting means for correcting the course of the aircraft.

5. Apparatus for guiding an aircraft over terrain and including means for isotropically transmitting a radar pulse from the aircraft, means for picking up the return signals in terms of varying intensity versus range of targets located on the terrain over which the aircraft is passing, stored reference means on the aircraft providing signals in terms of varying intensity versus range from a plurality of laterally and longitudinally separated points above the terrain over which the aircraft should be passing if it is on course, said stored reference means constituting a previously prepared radar map of at least a portion of the terrain over which the aircraft should be passing if it is on course, means for spirally scanning the map to read out a signal in varying intensity versus range of the targets on the map, means for repeatedly changing laterally and longitudinally the starting point of the spiral scanning means followed by operation of the means for spirally scanning to produce the said plurality of reference signals, means for comparing the return signals with the reference means signals and for selecting the reference means signals nearest to the return signals, and means responsive to the output of the comparing and selecting means for correcting the course of the aircraft.

6. Apparatus for guiding an aircraft over terrain and including means for isotropically transmitting a radar pulse from the aircraft, means for picking up the return signals in terms of varying intensity versus range from a plurality of laterally and longitudinally separated points above the terrain over which the aircraft should be passing if it is on course, said stored reference means constituting a previously prepared radar map of at least a portion of the terrain over which the aircraft should be passing if it is on course, means for scanning the map with an expanding radially narrow ring to read out a signal in varying intensity versus range of the targets on the map, means for repeatedly changing laterally and longitudinally the starting point i.e. center of the expanding ring scanning means followed by operation of the means for scanning with the expanding ring to produce the said plurality of reference signals, means for comparing the return signals with the reference means signals and for selecting the reference means signals nearest to the return signals, and means responsive to the output of the comparing and selecting means for correcting the course of the aircraft.

7. Apparatus for guiding an aircraft over terrain and including means for isotropically transmitting a radar pulse from the aircraft, means for picking up the return signals in terms of varying intensity versus range of targets located on the terrain over which the aircraft is passing, stored reference means on the aircraft providing signals in terms of varying intensity versus range from a plurality of laterally and longitudinally separated points above the terrain over which the aircraft should be passing if it is on course, said stored reference means constituting a storage tube upon which electric charges have been impressed in the representation of a radar map of at least a portion of the terrain over which the aircraft should be passing if it is reasonably on course, means for scanning the charges impressed on the storage tube to read out a signal in terms of varying intensity versus range of the electrical charges representing terrain targets on the storage tube, means for repeatedly changing laterally and longitudinally the starting point of the scanning means followed by operation thereof to produce the said plurality of reference signals.

8. Apparatus for guiding a vehicle over terrain and including means for substantially isotropically transmitting a wave pulse from the vehicle, means for picking up the return signals in terms of varying intensity versus range of targets located on the terrain over which the vehicle is passing, stored reference means on the vehicle providing signals in terms of varying intensity versus range from a plurality of laterally and longitudinally separated points on the terrain over which the vehicle should be passing if it is reasonably on course, means for comparing the return signals with the reference means signals and for selecting the reference means signals nearest to the return signals, and means responsive to the output of the comparing and selecting means for correcting the course of the vehicle.

9. Apparatus for guiding a vehicle over terrain and including means for substantially isotropically transmitting a wave pulse from the vehicle, means for picking up the return signals in terms of varying intensity versus range of targets located on the terrain over which the vehicle is passing, stored reference means on the vehicle providing information in both range and azimuth of targets on the terrain over which the vehicle should be passing if it is reasonably on course, means for converting said information into terms of varying intensity versus range only, means for repeating the conversion of said information from a plurality of points separated laterally and longitudinally from each other to provide a plurality of reference signals in terms of varying intensity versus range, means for comparing the return signals with the reference means signals and for selecting the reference means signals nearest to the return signals, and means responsive to the output of the comparing and selecting means for correcting the course of the vehicle.

References Cited by the Examiner

UNITED STATES PATENTS

| | | | |
|---|---|---|---|
| 2,586,743 | 2/1952 | Thresher et al. | 343—5 |
| 2,753,552 | 7/1956 | Hom | 343—5 |
| 2,847,855 | 8/1958 | Berger | 343—5 |
| 3,054,999 | 9/1962 | Forbath et al. | 343—5 |
| 3,064,249 | 11/1962 | Forbath et al. | 343—5 |
| 3,071,765 | 1/1963 | Schutz | 343—5 |
| 3,102,260 | 8/1963 | Mihelich | 343—5 |

CHESTER L. JUSTUS, *Primary Examiner.*

J. CROWELL, R. M. SKOLNIK, T. H. TUBBESING,
*Assistant Examiners.*